United States Patent [19]

Bateson et al.

[11] 4,369,866
[45] Jan. 25, 1983

[54] VEHICLE TRANSMISSION SYSTEM

[75] Inventors: Simon V. R. Bateson, Stoke-on-Trent; Andrew Gerrard, Chorley, both of England

[73] Assignee: British Leyland UK Limited, London, England

[21] Appl. No.: 241,940

[22] Filed: Mar. 9, 1981

Related U.S. Application Data

[63] Continuation of Ser. No. 3,394, Jan. 12, 1979, abandoned.

[30] Foreign Application Priority Data

Jan. 12, 1978 [GB] United Kingdom ............... 1189/78

[51] Int. Cl.³ ............................................. B60K 41/22
[52] U.S. Cl. ................................................ 192/3.57
[58] Field of Search .................. 192/3.58, 3.57, 3.51, 192/3.61, 3.62; 74/481

[56] References Cited

U.S. PATENT DOCUMENTS

| | | | |
|---|---|---|---|
| 3,352,392 | 11/1967 | Black et al. | 192/3.57 |
| 3,386,543 | 6/1968 | Osburn | 192/3.57 |
| 3,459,285 | 8/1969 | Lamburn et al. | 192/3.57 |
| 3,664,470 | 5/1972 | Beech et al. | 192/3.57 |
| 3,687,248 | 8/1972 | Holub | 192/3.57 |

FOREIGN PATENT DOCUMENTS

| | | |
|---|---|---|
| 722042 | 1/1955 | United Kingdom . |
| 1201505 | 8/1970 | United Kingdom . |
| 1235566 | 6/1971 | United Kingdom . |

*Primary Examiner*—George H. Krizmanich
*Attorney, Agent, or Firm*—Brisebois & Kruger

[57] ABSTRACT

In a vehicle transmission where there are two ranges of gear ratios, changing between the ratios is achieved by means of a burst of compressed air triggered by depression of the clutch, which compressed air is used to set a valve in a compressed air line to an open or a closed position in dependence upon the position of a range pre-select control. When the valve is open one range is selected. When closed, the other range is produced.

7 Claims, 2 Drawing Figures

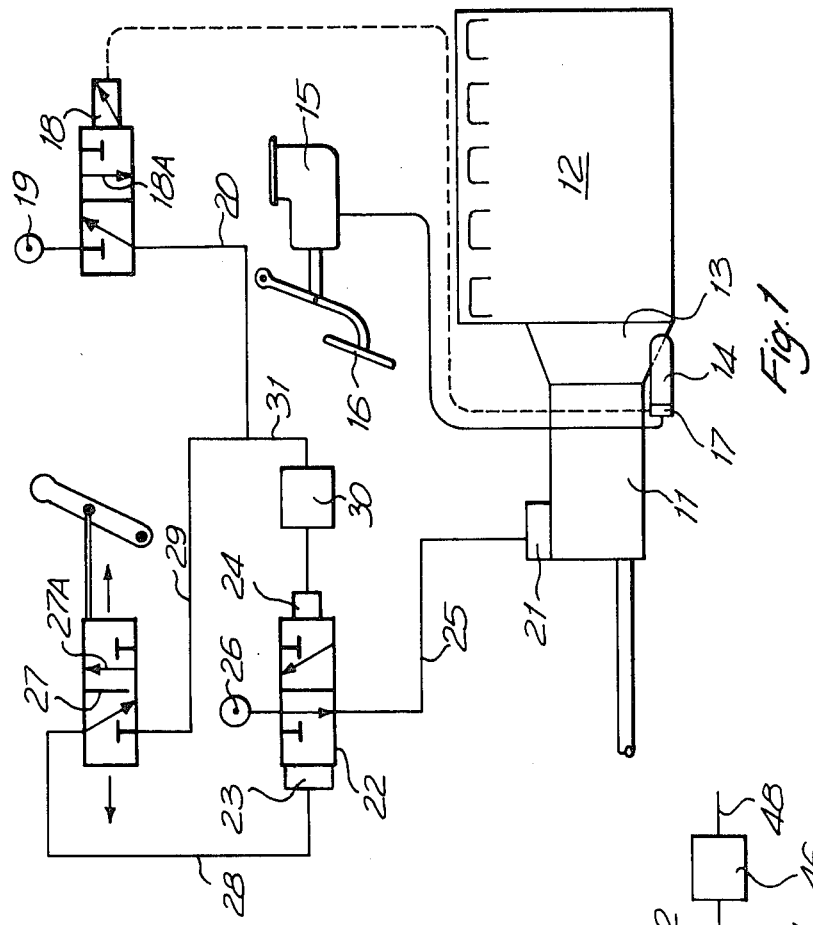
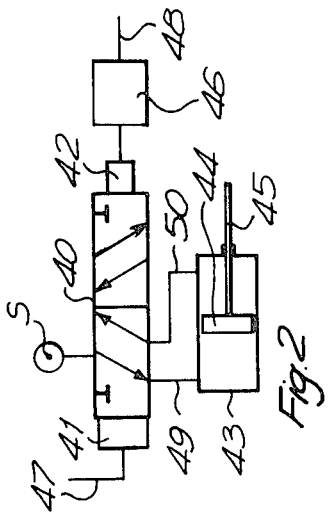

VEHICLE TRANSMISSION SYSTEM

This is a continuation of application Ser. No. 003,394, filed Jan. 12, 1979, now abandoned.

This invention relates to vehicle transmissions.

The invention provides a vehicle transmission comprising a clutch, a gear box, the gear box being adapted to provide first and second ranges of gear ratios, a preselect control for preselecting one of the ranges, a first valve which is adapted to allow the passage of gas from a supply of compressed gas on depression of the clutch, and a second valve which is adapted to control the passage of gas from a supply of compressed gas to means for changing the range of gear ratios in dependence upon the position of the second valve, in order to set the range of gear ratios, and the position of the second valve being set by the compressed gas passed by the first valve in dependence upon the position of the preselect control, so that the preselected range is set on depression of the clutch.

Advantageously, the preselect control is connected to a third valve having two settings corresponding to the respective gear ratio ranges, wherein the second valve has two piston areas of different magnitude, and wherein the first valve is connected by lines to both piston areas, the third valve being included in one of the lines, the arrangement being such that in use in one setting of the third valve, both piston areas can be pressurised and the second valve can move one way and in the other setting of the third valve, only one piston area can be pressurised and the second valve can move the other way.

A transmission system of a vehicle constructed in accordance with the invention will now be described, by way of example, with reference to the accompanying drawings, in which:

FIG. 1 is a schematic view of the transmission system; and

FIG. 2 is a schematic view of a modified form of a part of the transmission system shown in FIG. 1.

FIG. 1 shows a compressed air control system for operating a pre-selector splitter gear box. Gear box 11 is connected to engine 12 by means of a hydraulically operated clutch in housing 13. The clutch has a slave cylinder 14 which is remotely operable by master cylinder 15 actuated by foot pedal 16.

The hydraulic pressure in slave cylinder 14 is sensed by a pressure sensitive switch 17. When a pressure in excess of a predetermined amount is sensed by switch 17, an electrical signal is fed to a first valve 18 (which is a solenoid valve) to cause it to move from the position shown in which compressed air supply 19 is isolated from supply line 20 to the position where passage 18a causes the supply 19 to be coupled to line 20.

Gear box 11 has a splitter valve 21 which regulates whether a high or low range of gear ratios are available for individual manual selection in the gear box 11. The splitter valve 21 is regulated by way of a second valve 22. This has a priority piston 23 and a non-priority piston 24, one of which has a bigger area than the other.

Pre-selection of the high or low range is governed by a third valve 27 connected to a pre-select control mounted on the gear change lever for operation by the vehicle driver. As shown the valve 27 is in the low range gear ratio position. The valve 27 incorporated a passage 27a to couple line 28 to line 29. A delay reservoir 30 is positioned in line 31 joining line 20 to piston 24 to cause the compressed air from line 20 to reach priority and non-priority pistons at approximately the same time, when valve 27 is in the position in which its passage 27a connects line 28 to line 29.

To pre-select a high range gear, the valve 27 is moved to a position where passage 27a joins lines 28,29. To engage the gear the clutch pedal 16 is depressed so causing a hydraulic pressure increase to be transmitted from master cylinder 15 to slave cylinder 14. This causes pressure sensitive switch 17 to generate an electrical signal which is fed to solenoid valve 18. The valve 18 is displaced to cause passage 18a to couple supply 19 to line 20. As a consequence air is supplied to priority piston 23 and to non-priority piston 24 (which has the smaller area) causing the valve to be moved to the position illustrated where air is fed from supply 26 to line 25 and so to splitter valve 21. Thereafter the high range of gears is selected. On releasing the clutch pedal 16, the valve 18 closes to vent line 20 leaving splitter valve 21 in the high range state.

On moving valve 27 to the low range (illustrated) position, depression of clutch pedal 16 causes valve 18 to connect source 19 to line 20. However, valve 27 blocks supply and vents priority piston 23. The supply of compression air to non-priority piston 24 drives valve 22, and splitter valve 21 to the low position where source 26 is isolated and valve 21 is vented. On clutch pedal release air is exhausted from the system leaving the splitter valve 21 in the low range state.

The delay reservoir has a volume such that compressed air reaches the priority piston marginally before it reaches the non-priority piston. This prevents any tendency for the valve 22 to be displaced on ordinary clutch changes when the valve 27 is preselecting a high gear and the valve 22 is already set in the appropriate position; if air reached the non-priority piston first, the valve would first move to the left before being returned to the illustrated position.

FIG. 2 shows an arrangement combining the valve 22 and splitter valve 21 shown in FIG. 1. In this embodiment an air operated five port valve 40 is provided with priority piston 41 and non-priority piston 42. The valve is coupled to supply S of compressed air. On the gear box a splitter cylinder 43 is mounted with piston 44 for displacing piston rod 45 which acts directly on the range change system of the gear box. Valve 40 and cylinder 43 are connected by lines 49,50. As was shown in FIG. 1, a delay reservoir 46 is coupled by line 48 to a solenoid valve operable by the clutch and the priority piston 41 is connected to a valve corresponding to valve 27 (FIG. 1) by way of line 47. The remaining components of the circuit associated with valve 40 correspond to those shown in FIG. 1. The valve 40 is shown in a first position in which source S is connected to the left-hand side of piston 44 by way of line 49 and the volume on the right-hand side of the piston is vented to atmosphere by way of line 50 and valve 40. The valve 40 holds this first position as long as both pistons 41 and 42 are pressurised. When the valve 40 is switched to a second position by venting of line 47 and pressurisation of non-priority piston 42 only, the supply S is connected to the right hand side of cylinder 43 by line 50, line 49 is vented to atmosphere through valve 40, and pressure from source S on the right hand side of piston 44 causes piston 44 to move to the left. The head end of piston 44 and the portion of cylinder 43 to the left of this head end comprise first pressure-actuated means for changing the range of gear ratios to one of said ratios in response to pressurization thereof, and the rod end of piston 44 and the portion of cylinder 43 to the right of this rod end comprise second pressure actuated means for changing the range of gear ratios to the other of said gear ratios in response to pressurization thereof.

In a further modification (not illustrated), the pressure switch 17 and the solenoid valve 18 are replaced by a hydraulic pressure sensitive three port valve. One port is connected to the source 19 as before. The second is connected directly to the hydraulic clutch fluid. When the clutch fluid pressure increases as the clutch is depressed, the valve triggers so as to join the (previously isolated) first and second ports.

We claim:

1. A vehicle transmission comprising a clutch, a gear box having first and second ranges of gear ratios, first valve means connected to a source of compressed gas, said first valve means being actuable to a position to allow the passage of gas from said source, actuating means for moving said valve to said gas passage position in response to depressing said clutch, pressure actuated means for changing the range of gear ratios to one of said ratios in response to pressurization thereof, and for permitting changing to the other of said ratios in the absence of pressurization thereof, second valve means connected between a source of compressed gas and said pressure actuated means, said second valve means being actuable to a first position in which said source is connected to and continuously communicates with said pressure actuated means to change to and maintain said one gear ratio, and to a second position in which said source is disconnected from said pressure actuated means, actuator means responsive to the passage of gas from the first valve means for actuating said second valve to its first and second positions, and preselector control means for preselecting the range of gear ratios and comprising means for selecting the position to which said second valve is moved in response to passage of gas from said first valve means when said clutch is depressed.

2. A vehicle transmission as claimed in claim 1, wherein the pre-select control means is connected to a third valve having two settings corresponding to the respective gear ratio ranges, wherein said actuator means of the second valve means comprises two piston areas of different magnitude, and wherein the first valve means is connected by lines to both piston areas, the third valve means being connected in one of the lines, so that in use, in one setting of the third valve means, both piston areas are pressurized when the clutch is depressed and the second valve means moves to one of said positions, and in the other setting of the third valve means, only one piston area is pressurized when the clutch is depressed and the second valve moves to the other of said positions.

3. A vehicle transmission comprising a clutch, a gear box having first and second ranges of gear ratios, first valve means connected to a source of compressed gas, said first valve means being actuable to a position to allow the passage of gas from said source, actuating means for moving said valve to said gas passage position in response to depressing said clutch, first pressure actuated means for changing the range of gear ratios to one of said ratios in response to pressurization thereof, second pressure actuated means for changing the range of gear ratios to the other of said gear ratios in response to pressurization thereof, second valve means connected between a source of compressed gas and said first and second pressure actuated means, said second valve means being actuable to a first position in which said source is connected to and continuously communicates with said first pressure actuated means to change to and maintain said one gear ratio, and to a second position in which said source is connected to and continuously communicates with said second pressure actuated means to change to and maintain said other gear ratio, actuator means responsive to the passage of gas from the first valve means for actuating said second valve to its first and second positions, and preselector control means for preselecting the range of gear ratios and comprising means for selecting the position to which said second valve is moved in response to passage of gas from said first valve means when said clutch is depressed.

4. A vehicle transmission as claimed in claim 3, wherein the preselect control means is connected to a third valve having two settings corresponding to the respective gear ratio ranges, wherein said actuator means of the second valve means comprises two piston areas of different magnitude, and wherein the first valve means is connected by lines to both piston areas, the third valve means being connected in one of the lines, so that in use, in one setting of the third valve means, both piston areas are pressurized when the clutch is depressed and the second valve means moves to one of said positions, and in the other setting of the third valve means, only one piston area is pressurized when the clutch is depressed and the second valve moves to the other of said positions.

5. A vehicle transmission according to claim 3 wherein said first pressure actuated means comprises a head end of a piston in a cylinder, and said second pressure actuated means comprises a rod end of said piston in said cylinder.

6. A vehicle transmission as claimed in claim 1, 2, 3, or 4, wherein said clutch comprises a hydraulic clutch operated by clutch fluid, and said actuating means of the first valve comprises a solenoid triggered by a pressure sensor responsive to pressure of the clutch fluid.

7. A vehicle having a transmission as claimed in claim 1, 2, 3 or 4.

* * * * *